UNITED STATES PATENT OFFICE.

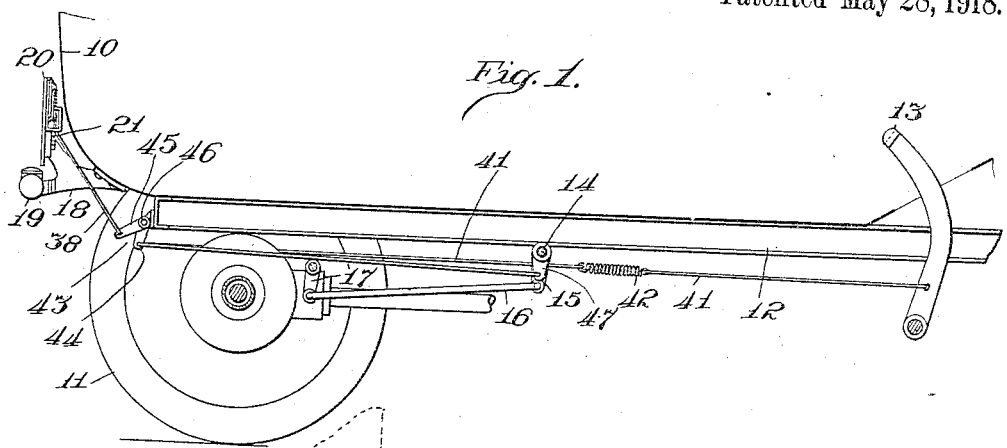

CHARLES J. NORDSTROM, OF EVANSTON, ILLINOIS.

AUTOMOBILE-SIGNAL.

1,267,790.  Specification of Letters Patent.  Patented May 28, 1918.

Application filed February 5, 1917. Serial No. 146,819.

*To all whom it may concern:*

Be it known that I, CHARLES J. NORDSTROM, a citizen of the United States, and resident of Evanston, county of Cook, and State of Illinois, have invented certain new and useful Improvements in Automobile-Signals, of which the following is a specification and which are illustrated in the accompanying drawings, forming a part thereof.

The invention relates to signals for automobiles and more particularly to a signal intended to be displayed at the rear of the vehicle for supplying information regarding the movements of the vehicle to drivers of following vehicles. The object of the invention is to provide a signal for this purpose which shall be of simple construction, effective in service and automatically operable upon movement of the controlling levers of the automobile.

In the accompanying drawings

Figure 1 is a longitudinal sectional view showing details of an automobile, conventionally represented, with the improved signal applied thereto, Fig. 2 is an elevation showing the inner face of the improved signal, some of the parts being broken away and others being shown in section, Fig. 3 is a central vertical sectional view of the improved signal, also showing a detail of a supporting bracket, and Fig. 4 is an elevation showing the face of the signal as it appears when viewed from the rear of the automobile to which it is applied.

The body of the automobile is conventionally represented at 10, one of the rear wheels being shown at 11. The chassis frame is generally designated 12 and the pedal for releasing the clutch is represented at 13. As is usual in some automobiles of well-known construction, a transverse rock shaft 14 is rotatably secured against the under-side of the chassis frame 12 for operating the brakes. The drawings show this rock shaft as being provided with a crank arm 15. A link 16 connects this crank arm with the brake knuckle 17.

A bracket 18 serves for supporting the tail lamp 19 and license plate 20. In this instance the bracket 18 has a transverse arm 21 to which the license plate 20 is secured, and the tail lamp 19 is supported under the said transverse arm for illuminating the license plate 20, from below.

The improved signal preferably comprises two targets, 22 and 23, both of which are normally concealed by the license plate 20. It is intended that one of these targets, as 22, shall be exposed to display the word "Slow," when the automobile driver releases the clutch. The other target, as 23, is to be exposed to display the word, "Stop," when the brakes are applied. As shown, both of the targets 22 and 23 are of oblong rectangular shape and they are pivotally secured against the inner face of a flat plate 24. In applying the improved signal to the particular automobile upon which it is to be used, the plate 24 is firmly bolted against the inner face of the license plate 20 near its upper edge. The pivots, as 25, and 26, for the targets 22 and 23, are located near the upper edge of the plate 24 and adjacent to but at opposite sides of the center line of this plate. Each of the targets 22 and 23 is accordingly held near one corner. In order that each target, when in concealed position, may be held flat against the inner face of the plate 24, a pair of upstanding fingers 27 and 28 are struck out of the plate 24 near its opposite ends. Each of these fingers accordingly provides an upwardly facing socket for receiving the corresponding target.

The means for swinging the targets 22 and 23 upon the pivots 25 and 26 may comprise a pair of links 29 and 30. As shown, one of these links is pivotally attached to each of the targets near the upper inner corner of the target. The free ends of the links 29 and 30 are guided by being slidingly extended through an inturned upper end portion 31 of a folded bracket plate 32. This folded bracket plate is preferably secured against the plate 24, between and below, the two targets 22 and 23. As shown, one of the bolts, as 33, employed for securing the plate 24 against the license plate 20, is also extended through the two sides of the bracket 32. Under these circumstances, the required separation of the two sides of the bracket 32 is maintained by applying a bushing 34 to the bolt 33. Each link 29, 30, is shouldered adjacent its upper end, as at 35, and a spring 36 is coiled about the link to react between the said shoulder and the upper end portion 31 of the bracket 32. The springs 36 accordingly serve for retaining the targets 22 and 23 in their concealed positions.

The exposure of each target 22 or 23, is accomplished by pulling upon the corresponding link 29 or 30. For this purpose a flexible cable, as 37 or 38, is attached to the lower end of each link 29, 30. These cables are extended through openings, as 39, in the lower horizontal portion 40 of the bracket 32. In order that pulling upon the cables 37, 38 may not serve to displace the license plate 20, the parts are preferably so proportioned that the lower horizontal portion 40 of the bracket 32 rests upon the transverse arm 21 of the bracket 18.

The target 22 will be exposed whenever the clutch (not shown) is released if the cable 37 is extended forwardly under the vehicle body 10 and has its front end connected with the clutch pedal 13, as at 41 (Fig. 1). Inasmuch as the movement of the clutch pedal 13 may exceed that permitted in the link 29 the cable 37 is preferably divided into sections and a stout spring 42 is interposed between the adjacent ends of the two sections. Similarly, in order that the cable may be suitably guided about the lower rear end of the vehicle body and chassis, the cable is further divided at 43 and the two ends connected with the relatively inclined arms 44 and 45 of a bell crank lever 46. The bell crank lever 46 may be supported in any convenient manner, as by being secured against the rear end of the frame 12 of the chassis.

As the target 23 is only to be exposed when the brakes are applied, the cord 38 is preferably connected with a crank arm 47 of the rock shaft 14. The cable 38 may be guided about the lower rear end of the vehicle body and chassis in the same manner as the cable 37. On the other hand, as the amount of angular movement of the rock shaft 14 is always limited and is substantially the same, whether the brakes are applied with but little or with great force, no spring will usually be required between the ends of the cable 38.

As each of the targets 22 and 23 will usually have a rapid angular movement from its concealed to its exposed position, the exposure of either of these targets will immediately attract attention. Should the brakes be applied at the same time that the clutch pedal 13 is depressed, both of the targets 22 and 23 will be exposed simultaneously. The driver of a following vehicle will thus be advised that the driver in front of him is intending to stop. As the clutch is usually released before rounding a corner the driver of a following vehicle will be advised to use caution by the appearance of the target 22.

I claim as my invention:

1. In an automobile signal, in combination, a substantially flat supporting plate, a pair of differentiated swinging targets both normally resting against the back of the supporting plate and concealed thereby, the two targets extending outwardly in opposite directions from the center line of the supporting plate with the upper edges of the targets substantially flush with the upper edge of the plate, a pivot uniting each target with the supporting plate near the upper inner corner of the target, a bracket projecting rearwardly from the supporting plate, a pair of upright links each having its upper end connected with one of the targets at the upper inner corner of the target and sliding through the said bracket, a spring coiled about each link above the bracket and an independent cord attached to the lower end of each link.

2. In an automobile signal, in combination, a substantially flat supporting plate, a swinging target movable in a plane parallel with but in rear of the plate, the target being normally concealed by the plate, a pivot uniting the plate and target adjacent the upper edge of the plate, a bracket projecting rearwardly from the plate, a link connected with the target and sliding through the bracket, a spring coiled about the link and bearing on the bracket and a pull cord attached to the link.

CHARLES J. NORDSTROM.

Copies of this patent may be obtained for five cents each, by addressing the "Commissioner of Patents, Washington, D. C."